(12) United States Patent
Smith et al.

(10) Patent No.: US 6,543,146 B2
(45) Date of Patent: Apr. 8, 2003

(54) ELECTRONIC COMPASS AND COMPENSATION OF LARGE MAGNETIC ERRORS FOR OPERATION OVER ALL ORIENTATIONS

(75) Inventors: Robert B. Smith, St. Anthony, MN (US); Blaise Grayson Morton, Wheeling, IL (US); Michael R. Elgersma, Plymouth, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/731,177

(22) Filed: Dec. 6, 2000

(65) Prior Publication Data

US 2002/0100178 A1 Aug. 1, 2002

(51) Int. Cl.$^7$ .............................................. G01C 17/38
(52) U.S. Cl. ........................................ 33/356; 33/357
(58) Field of Search .............................. 33/356, 355 R, 33/357, 358, 359, 361

(56) References Cited

U.S. PATENT DOCUMENTS

| | | | |
|---|---|---|---|
| 4,414,753 A | 11/1983 | Moulin et al. | 33/356 |
| 4,539,760 A | 9/1985 | Marchent et al. | 33/356 |
| 4,672,565 A | 6/1987 | Kuno et al. | 364/571 |
| 4,698,912 A | 10/1987 | Fowler et al. | |
| 4,797,841 A | 1/1989 | Hatch | 364/571.04 |
| 5,010,653 A * | 4/1991 | Fowler | 324/247 |
| 5,021,962 A * | 6/1991 | Helldorfer et al. | 33/356 |
| 5,105,548 A * | 4/1992 | Fowler | 324/247 |
| 5,117,375 A | 5/1992 | Worcester et al. | 364/571.01 |
| 5,345,382 A * | 9/1994 | Kao | 33/356 |
| 5,682,335 A | 10/1997 | Assous et al. | |
| 5,828,984 A | 10/1998 | Cage et al. | 702/92 |
| 5,850,624 A * | 12/1998 | Gard et al. | 33/356 |
| 5,953,683 A | 9/1999 | Hansen et al. | |
| 6,301,794 B1 * | 10/2001 | Parks et al. | 33/356 |

FOREIGN PATENT DOCUMENTS

| | | | |
|---|---|---|---|
| EP | 0 331 261 | * 2/1989 | G01R/1/18 |
| WO | WO-99/50619 | 10/1999 | |

OTHER PUBLICATIONS

Liu, S., et al., "Compass Deviation Analysis and Compensation for a Three–Axis Strapdown Magnetic Heading System", *IFAC 11th Triennal World*, Tallinn, Estonia, USSR, pp. 471–474, (1990).

* cited by examiner

*Primary Examiner*—Diego Gutierrez
*Assistant Examiner*—Tania C. Courson
(74) *Attorney, Agent, or Firm*—Schwegman, Lundberg, Woessner & Kluth, PA

(57) ABSTRACT

A three-axis algebraic model is used to numerically compensate for magnetic errors in measured magnetic field values in an electronic compass for any orientation of the compass. This model is based on physical principles and uses a linear algebra approach that facilitates computation of the parameters needed for compensation. During a calibration procedure of the electronic compass, magnetic and gravity fields are measured in three axes at each of a variety of combinations of orientations and azimuths. This set of measured magnetic and gravity fields is used to calculate a matrix compensation coefficient and a vector compensation coefficient using a system of equations. These compensation coefficients are stored and then used during normal operations of the electronic compass to correct all subsequently measured magnetometer data to obtain corrected values for the Earth's magnetic field, from which the correct azimuth can be calculated.

27 Claims, 10 Drawing Sheets

ELECTRONIC COMPASS AND COMPENSATION OF LARGE MAGNETIC ERRORS FOR OPERATION OVER ALL ORIENTATIONS

STATEMENT OF GOVERNMENT INTEREST

This invention was made with Government Support under contract number DAAB07-95-C-M028. The Government has certain rights in the invention.

FIELD OF THE INVENTION

The present invention relates to electronic compasses. More particularly, the present invention relates to compensation of electronic compasses for magnetic errors.

BACKGROUND

Electronic compasses are well known in the art. Such devices typically have used magnetic flux gate or other sensors to measure magnetic fields and to determine orientation with respect to the Earth's magnetic field. As with needle- or card-based compasses, however, when an electronic compass is used in an environment of ferrous metals and associated perturbing fields, the fields sensed by the magnetometer sensors are perturbed, leading to erroneous readings of the Earth's magnetic field and the compass magnetic azimuth.

To obtain correct readings, it is necessary to compensate for these magnetic perturbations. Compensating needle- or card-based compasses requires the use of bar magnets and/or soft iron masses to physically neutralize and cancel perturbing magnetic fields. These magnets and soft iron masses must be positioned carefully about the compass so as to cancel preexisting perturbations and reduce the deviation errors to, for example, 3–5°. Even after this reduction, however, residual deviation errors must be plotted against true azimuth so that the user can correct the azimuth value.

Electronic compasses, which use microprocessors to process the data received from the magnetometer sensors, can be compensated using numerical methods. One particular example of compensation using numerical methods is the classical five-term compensation formula for a level compass. In this formula, the deviation of the aximuth as measured by the compass from the true azimuth is expressed in degrees as a function of the true magnetic azimuth θ as follows:

Deviation=$A+B\cdot\sin(\theta)+C\cdot\cos(\theta)+D\cdot\sin(2\theta)+E\cdot\cos(2\theta)$ where A, B, C, D, and E are coefficients whose values are determined through some calibration procedure. This compensation technique exhibits certain limitations. For example, the above formula is only an approximate expression, valid only for small deviations and small values of A, B, C, D, and E. Thus, this technique is only used after physical compensation to reduce deviation errors, e.g., through the addition of magnets and/or soft iron masses. In addition, the formula is valid only for a level compass and is therefore poorly suited for use in environments in which the orientation of the compass may vary widely within three-dimensional space, such as heeled ships. Changes in latitude can also affect the quality of compensation. While this compensation technique is reasonable for use also with aircraft flux gate compasses, it is only approximate for common pendulous flux gate compasses, as the coefficients are dependent on tilt attitude and magnetic latitude.

Certain conventional compensation techniques have been implemented, but many are limited to two-axis compasses and do not produce adequate results for a variety of arbitrary orientations of the compass in three-dimensional space. Some conventional compensation techniques have been applied to three-axis compasses. Such conventional techniques, however, fail to adequately compensate for certain types of errors because they rely on symmetric coefficient matrices.

SUMMARY OF THE INVENTION

The present invention addresses these and other problems by using a three-axis physical model to numerically compensate for errors in measured magnetic field values in an electronic compass. This model is based on physical principles rather than approximations, and thus produces more accurate compensation. Furthermore, the model uses a linear algebra approach that facilitates application of the compensation and determination of the parameters needed for compensation. By using a three-axis physical model, the present invention compensates an electronic compass over all orientations and is not limited to use in relatively level orientations.

According to one embodiment, the present invention is directed to a method of compensating an electronic compass to obtain accurate azimuth data despite the presence of perturbing magnetic effects. For each of a plurality of combinations of orientations and azimuths, a measured magnetic field vector $H_{MEAS}$ representing magnetic field strength in three axes and a measured gravity vector $G_{MEAS}$ representing gravitational field strength in three axes are obtained. These vector values are used to calculate a matrix compensation coefficient $L_E$ and a vector compensation coefficient $H_{PE}$ using a system of equations. The matrix compensation coefficient $L_E$ and the vector compensation coefficient $H_{PE}$ are then used to correct subsequently measured magnetometer output data to obtain the accurate Earth's magnetic field data.

Additional embodiments are directed to electronic compass arrangements and microprocessor-readable media for performing these methods. The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings, in which.

Figure 1A:
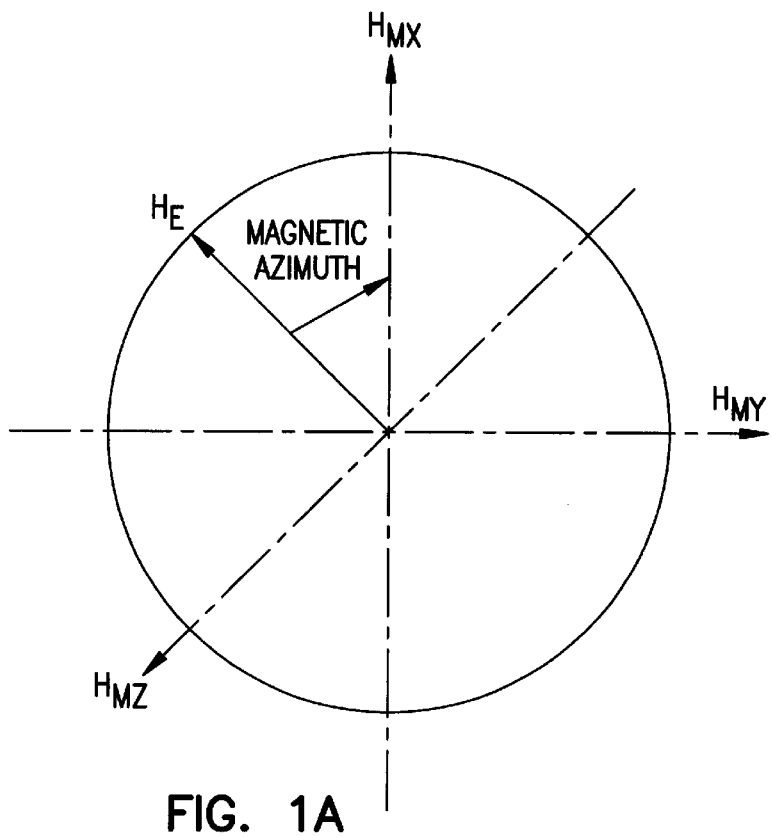
FIG. 1A illustrates the locus of the Earth's measured magnetic field in a level plane without perturbations.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to electronic compasses. The invention has been found to be particularly advantageous for use for compasses operating over diverse orientations and in adverse magnetic environments with potentially large magnetic perturbations. An appreciation of various aspects of the invention can be gained through a discussion of various implementations of the invention.

The invention advantageously provides accurate compensation and operation over all possible orientations of the compass, allowing completely arbitrary orientations of the vehicle or equipment on which the compass is installed. Both "hard iron" and "soft iron" errors are compensated. Large fixed magnetic perturbations, even those stronger than the Earth's magnetic field, are compensated. Because compensation is applied to the magnetic signals before they are used to calculate the azimuth, greater accuracy is achieved relative to conventional techniques. Accuracy is also improved because the compensation formula used in the present invention is based on the physics of magnetic fields, obviating the need for mathematical approximations.

A further advantage is that the same magnetic compensation formula and calibration procedure also compensate for several non-magnetic sensor errors, such as zero offsets, unequal scale factors, axis misalignments, and misalignments between magnetometers and orientation sensors.

According to one example embodiment of the present invention, an electronic compass is based on a three-axis electronic magnetometer fixed with respect to a vehicle or other equipment on which it is installed. Three-axis accelerometers or orientation sensors measure the direction of gravity in order to determine the local level plane in which the compass azimuth is defined. Those skilled in the art will appreciate that the direction of gravity can be sensed using other arrangements, such as an aircraft flight control sensor system. A computer microprocessor uses the numerical values obtained for the measured magnetic fields and measured gravity field to calculate the magnetic azimuth of the axis of the compass regardless of its orientation. As a result, the compass can operate in any orientation and does not need to be held level.

In order to calibrate the compass, magnetic and gravity measurements are taken at various well-distributed combinations of pitch, roll, and azimuth orientations. Next, for each such orientation, an equation is constructed that expresses the estimated Earth's magnetic field as a function of the measured field, a matrix coefficient, and a vector coefficient, which are to be determined. A system of equations is thus constructed from the set of measurements. Some of these equations are linear and others are quadratic; the quadratic equations are restructured as approximately linear equations.

Next, the subset of linear equations is first solved to obtain a preliminary estimate for the values of the matrix and vector coefficients. Next, the entire system of equations is solved to refine the preliminary estimate. The entire system is optionally solved iteratively to further refine the estimate, thus improving accuracy of compensation. The matrix and vector coefficient values are then stored for use during normal operation of the electronic compass to compensate for magnetometer errors.

The remainder of this disclosure begins with a discussion of principles underlying the present invention. Next, a process for obtaining measurements for use in calibrating an electronic compass is described. The formula used in compensating the compass is then discussed. The disclosure concludes with a discussion of a process for solving the system of equations, which yields the necessary values for the needed numerical coefficients.

Underlying Principles

As previously discussed, the measured magnetic fields are susceptible to errors caused by, for example, ferrous metals in the operating environment. These errors are attributable to additive magnetic perturbations, which in turn cause azimuth deviation errors. Because of these perturbations, the measured magnetic field $H_{MEAS}$ differs from the Earth's magnetic field $H_{EARTH}$ as follows:

$$H_{MEAS} = H_{EARTH} + H_{INDUCED} + H_{PERM}$$

where $H_{INDUCED}$ represents the induced magnetic field perturbation, and $H_{PERM}$ represents the permanent magnetic field perturbation.

Figure 1B:
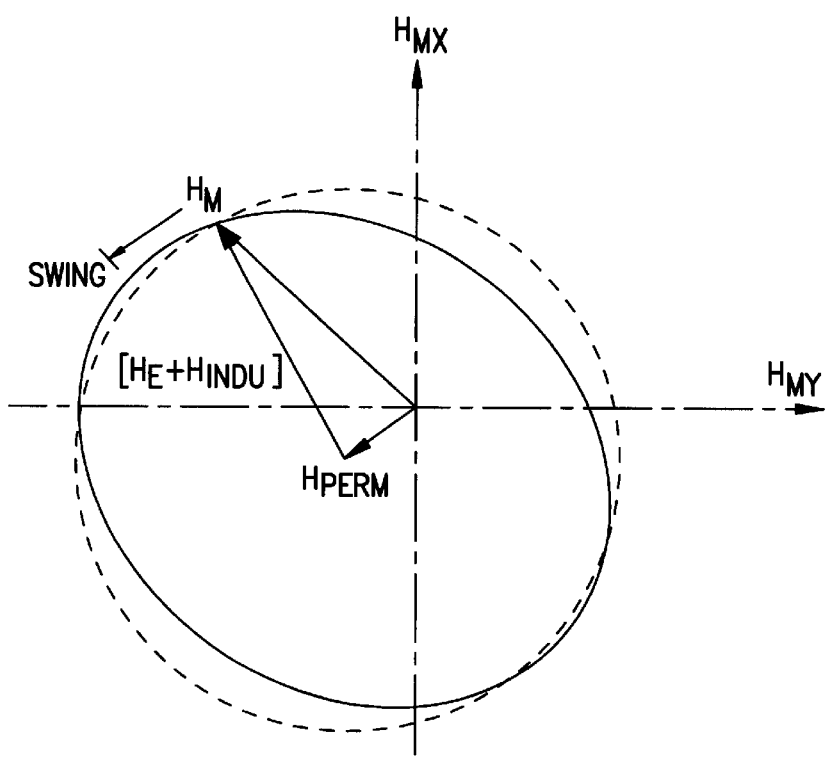
FIG. 1B illustrates combined effects of both permanent-field and induced-field magnetic perturbations on the locus of a magnetic field as measured by a magnetometer.

The effect of perturbations on the measured field can be seen for a very simple two-axis case in FIGS. 1A and 1B. FIG. 1A illustrates the locus of the Earth's magnetic field without perturbations, assuming a level compass and 360 degree compass swing. As can be seen in FIG. 1A, the locus is a circle, with azimuth defined clockwise from magnetic north. $H_{EARTH}$ rotates counterclockwise with compass swing, and the vertical magnetic field component $H_Z$ is constant.

FIG. 1B illustrates combined effects of $H_{PERM}$ and $H_{INDUCED}$, which cause the locus to be off-centered and elliptical, respectively. Thus, the locus is an off-centered ellipse that can have any orientation. Further, points may be rotated along the ellipse. If $H_{PERM}$ is larger than $H_{EARTH}$, then $H_{MEAS}$ does not do a full swing, resulting in 180 degree error at some point. In addition, $H_{INDUCED}$ perturbations can cause $H_{MEAS}$ to be characterized by a constant deviation error at all azimuths and to be incorrect at all orientations.

The permanent field perturbation $H_{PERM}$ results from permanent magnetization and DC currents in any part of the compass and its installation. As a result, in the compass case, $H_{PERM}$ is fixed and constant relative to the compass and the installation. Because $H_{EARTH}$ varies with orientation, the orientation of $H_{PERM}$ relative to $H_{EARTH}$ changes with the orientation of the compass. $H_{PERM}$ causes zero offsets in measured fields for all three axes, which result in azimuth deviation errors. These errors vary with azimuth and tilt orientations.

The induced-field perturbation $H_{INDUCED}$ is attributable to magnetizable soft iron material in the environment in which the compass operates. $H_{INDUCED}$ is variable in both magnitude and direction and is proportional to $H_{EARTH}$:

$$H_{INDUCED} = K \cdot H_{EARTH},$$

where K is a susceptibility-like matrix.

The induced magnetic field perturbation vector $H_{INDUCED}$ can always be resolved into three linearly independent contributions, such that $$H_{INDUCED} = H_1(H_{EARTH}) + H_2(H_{EARTH}) + H_3(H_{EARTH}) K \cdot H_{EARTH},$$

where K is a 3×3 magnetic susceptibility matrix that characterizes $H_{INDUCED}$ as a function of $H_{EARTH}$. The directions of unit vectors $h_1$, $h_2$, and $h_3$, along the three field contributions $H_1$, $H_2$, and $H_3$ at the sensors, are fixed and orthogonal to each other and do not depend on the direction of the Earth's magnetic field, $H_{EARTH}$. When any of these contributions reaches a maximum positive or negative value with changing orientation of $H_{EARTH}$, the other two contributions are zero.

The orientation of the field $H_{EARTH}$ itself has three corresponding particular orthogonal directions, denoted by unit vectors $e_1$, $e_2$, and $e_3$, along which the respective contribution of $H_{EARTH}$ will reach a maximum magnitude in either a positive direction or a negative direction. These maximum magnitudes will have distinct values, denoted as $k_1$, $k_2$, and $k_3$. The two orthogonal triads, associated with $H_{INDUCED}$ and $H_{EARTH}$, are independent from each other. The triads and the maximum magnitudes can both be deduced and displayed using the magnetic susceptibility matrix K using a technique known as singular value decomposition, or SVD.

K can be factored into three SVD matrix factors as follows:

$$K \equiv [\,h_1\,|\,h_2\,|\,h_3\,] \cdot \begin{bmatrix} k_1 & 0 & 0 \\ 0 & k_2 & 0 \\ 0 & 0 & k_3 \end{bmatrix} \cdot \begin{bmatrix} e_1 \\ e_2 \\ e_3 \end{bmatrix}$$

where $h_1$, $h_2$, and $h_3$ are unit column vectors corresponding to induced field directions at the sensors, $k_1$, $k_2$, and $k_3$ are the peak magnitudes of each contribution, and $e_1$, $e_2$, and $e_3$ are unit row vectors corresponding to the orthogonal directions along which the Earth's magnetic field $H_{EARTH}$ may lie. A three-term Dyadic representation of K may be derived as a sum of three matrices obtained from the column vectors h) and the row vectors (e, acting from the left on $H_{EARTH}$:

$$K = h_1 > k_1 < e_1 + h_2 > k_2 < e_2 + h_3 > k_3 < e_3 \equiv K_1 + K_2 + K_3$$

When K acts on $H_{EARTH}$, the above equation becomes:

$$K \cdot H_{EARTH} = h_1 > k_1 < e_1 \cdot H_{EARTH} > + h_2 > k_2 < e_2 \cdot H_{EARTH} > + h_3 > k_3 < e_3 \cdot H_{EARTH} >'$$

where $$h_1 > k_1 < e_1 \cdot H_{EARTH} > = H_1(H_{EARTH}),\ h_2 > k_2 < e_2 \cdot H_{EARTH} > = H_2(H_{EARTH}),$$
$$\text{and}\ h_3 > k_3 < e_3 \cdot H_{EARTH} > = H_3(H_{EARTH}).$$

For any value of K, the numerical singular value decomposition numerical values for these representations and the separate geometric contributions to $H_{INDUCED}$ and $H_{EARTH}$.

It is well known in the traditional art of physically compensating non-electronic compasses that there are nine independent types of errors associated with the induced magnetization perturbations, $H_{INDUCED}$. Further, there is a particular strength value associated with each of the individual types. In this tradition, there is a also a physical description of these different errors in terms of nine distinct "rods" of permeable magnetic material, each disposed in particular arrangements about the compass. These hypothetical rods are equivalent in their consequences to, or represent, the distribution of the ferrous materials in a compass installation. The nine rods in fact correspond to the nine elements of the K susceptibility matrix. There are no physical laws of magnetics which ascribe any special properties to the matrix K; for example, it is not a symmetric matrix, which would require only six element values to fix its specification.

Figure 2:
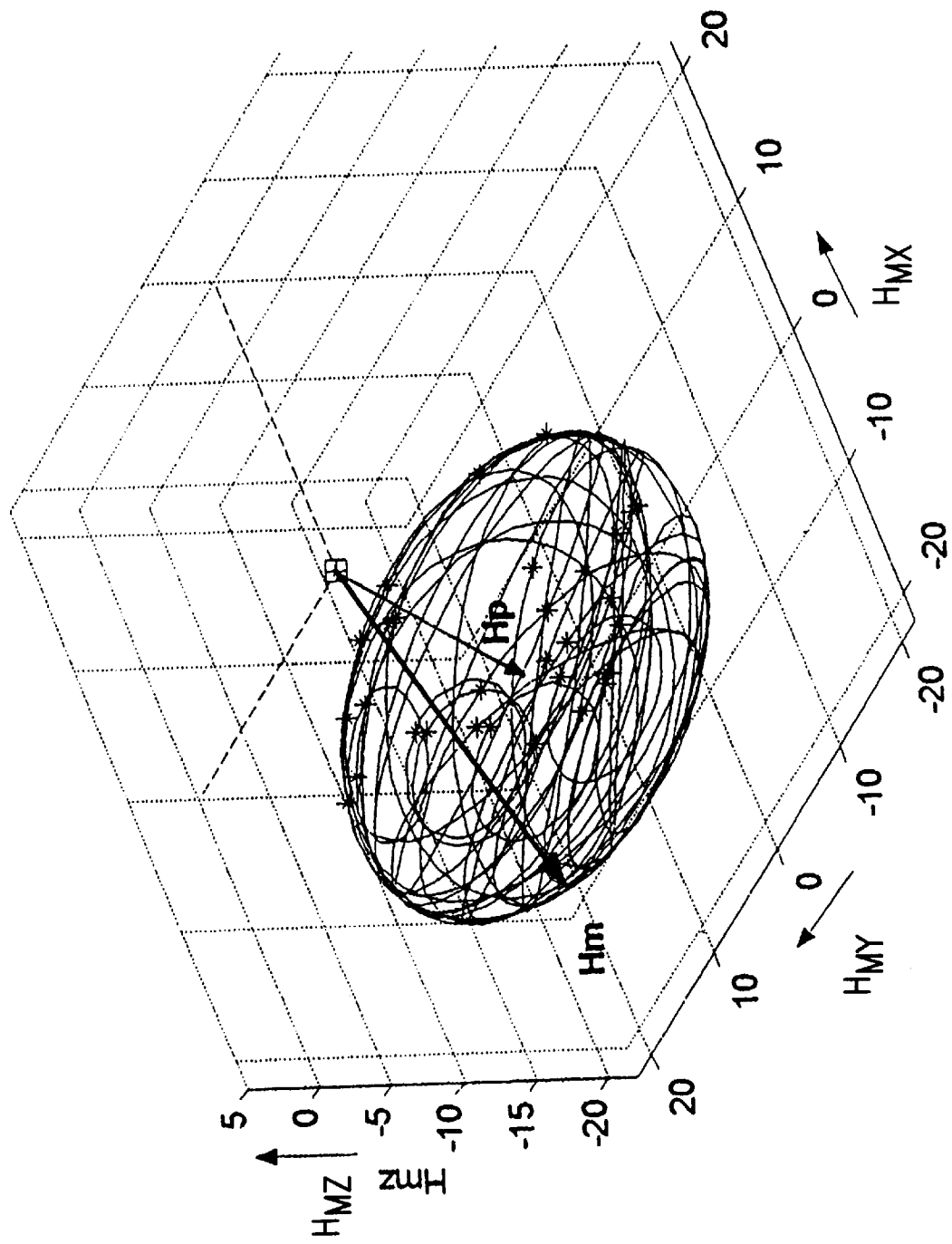
FIG. 2 illustrates combined effects of both permanent-field and induced-field magnetic perturbations on the locus of a magnetic field as measured by a magnetometer in three-axis space.

FIG. 2 illustrates combined effects of both permanent-field and induced-field magnetic perturbations on the locus of a magnetic field as measured by a magnetometer in three-axis space. It is well known in the field of linear algebra that any symmetric 3×3 matrix defines a three dimensional ellipsoidal surface for the magnitude of the sensor-measured magnetic field, as illustrated in FIG. 2. However, the asymmetric part of the more general matrix will further define different rotations and angular displacements of locus points along the surface of the ellipsoid, without altering the shape. Therefore, three of the nine types of errors may be described instead as rotations of the resulting measured magnetic field directions, in addition to the perturbations in the field strength represented by the ellipsoid. Compasses may differ significantly in these pure rotation errors, but have very similar errors in other respects.

FIG. 2 depicts several simulated examples of the locus for different fixed tilt orientations and magnetic latitudes. For each combination of tilt orientation and magnetic latitude, the locus is a closed plane ellipse obtained by taking a cross-section of the ellipsoidal surface illustrated in FIG. 2, which is characteristic of the compass and installation. The center of the ellipsoid is displaced from the origin by the line denoting the $H_{PERM}$ vector. On each individual locus, an asterisk marks the $H_{MEAS}$ value at which the compass azimuth is North. FIG. 2 illustrates the complexity and difficulty in determining how to compensate for the magnetic perturbations. There are twelve independent numerical constants associated with these characteristics of a compass.

Each of the individual error types may independently be present in a compass installation, to any degree and with positive or negative strength. In order to fully compensate compass errors arising from $H_{INDUCED}$ nine distinct types of compensation must be accurately accomplished. The permanent-magnetization perturbation, $H_{PERM}$, contributes a further three independent values which must be compensated, for a total of twelve. The present invention fully and accurately compensates all types of errors arising from $H_{INDUCED}$ and $H_{PERM}$.

K is typically relatively small. Because, in the measured field $H_{MEAS}$, $H_{EARTH}$ and $K \cdot H_{EARTH}$ always appear added, a magnetic permeability matrix M can be used to facilitate calculations, where M is related to K as follows:

$$M = (I_3 + K)$$

Thus, $$(H_{EARTH} + K \cdot H_{EARTH}) = (I_3 + K) \cdot H_{EARTH} = M \cdot H_{EARTH}$$

Considering both induced field perturbation and permanent field perturbation, the field $H_{MEAS}$ as measured by the magnetometer can be expressed using the formula:

$$H_{MEAS} = M \cdot H_{EARTH} + H_{PERM}$$

where M is the magnetic permeability matrix, as previously discussed. Any uncompensated compass can be fully characterized by determining the values of the matrix M and the vector $H_{PERM}$. This formula accounts for almost all forms of magnetic error associated with a compass, except for factors related to the instability of parameters, such as thermal and hysteresis considerations, shifting loads, and equipment errors.

Example Embodiments

Figure 3:
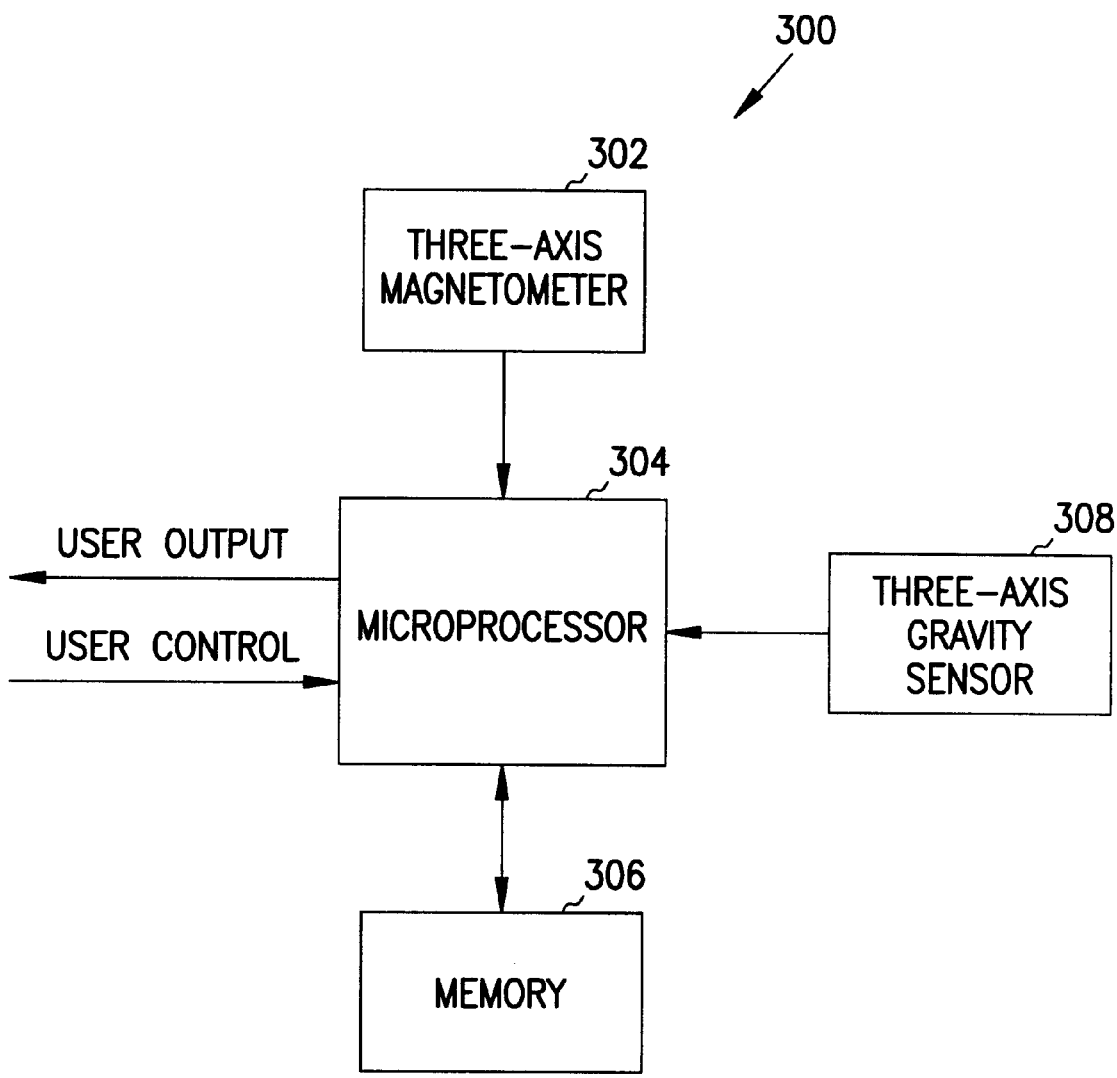
FIG. 3 is a block diagram illustrating an example compensated electronic compass arrangement, according to a particular embodiment of the present invention.
Figure 4:
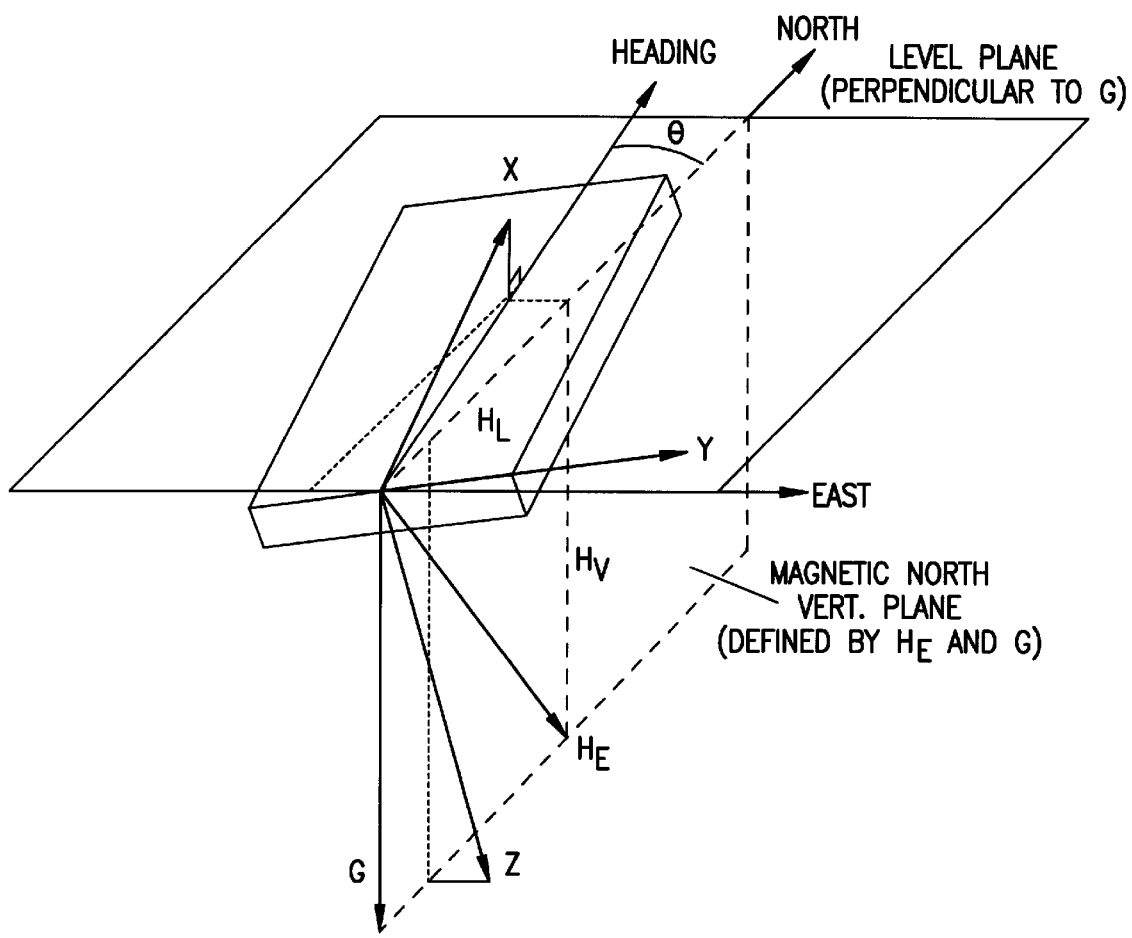
FIG. 4 depicts the coordinate systems associated with the compass of FIG. 3, as well as the local Earth-based coordinate system.

FIG. 3 is a block diagram illustrating an example compensated electronic compass 300, according to a particular embodiment of the present invention. The compass 300 includes a three-axis magnetometer 302 that is fixed with respect to the vehicle or other equipment on which it is installed. The magnetometer 302 measures the magnetic field with respect to a three-axis internal coordinate system as depicted in FIG. 4. In FIG. 4, the compass' internal coordinate system is denoted by x-, y-, and z-axes, and is depicted relative to the Earth level plane perpendicular to the gravity vector G. Usually, but not necessarily, the z-axis of the internal coordinate system is the downward direction relative to the equipment to which the compass is attached. The y-axis is perpendicular to the z-axis and extends to the right, and the x-axis is perpendicular to the y- and z-axes and is generally defined as the "forward" direction for the compass and the equipment. The x-axis is of particular interest; its orientation relative to Earth's magnetic north is used to define the azimuth. Specifically, the angle measured from the north direction to the x-axis direction defines the azimuth; this angle lies in the horizontal level plane. If the compass is not level, but is rather at a significant pitch and/or roll angle, then the azimuth is defined by the projection of the x-axis onto the horizontal level plane. Thus, the magnetic azimuth of interest is the angle measured from the level component of the Earth's magnetic field to the level component of the x-axis of the compass' internal coordinate system. This angle is positive when measured clockwise from the north direction.

The magnetometer 302 provides magnetic sensor data to a microprocessor 304, which performs all calculations. The microprocessor 304 stores the compensation data it generates in a memory 306, from which it retrieves data for use in compensating subsequently measured magnetometer data for magnetic errors. A gravity sensor 308 provides the microprocessor 304 with information as to the orientation of the electronic compass 300. This orientation data is used, along with the magnetometer data, to calibrate the electronic compass 300. The gravity sensor 308 can be implemented using, for example, a three-axis accelerometer or orientation sensors. As an alternative, the orientation data can be obtained using external information. For example, if the compass 300 is mounted on an airplane, the airplane's flight control or navigation system can be used to provide the orientation data, thus avoiding the need for a dedicated gravity sensor. After the electronic compass 300 has been calibrated, the compensation data is used to compensate magnetometer data for magnetic errors, thereby enabling accurate calculation of magnetic azimuth.

Figure 5:
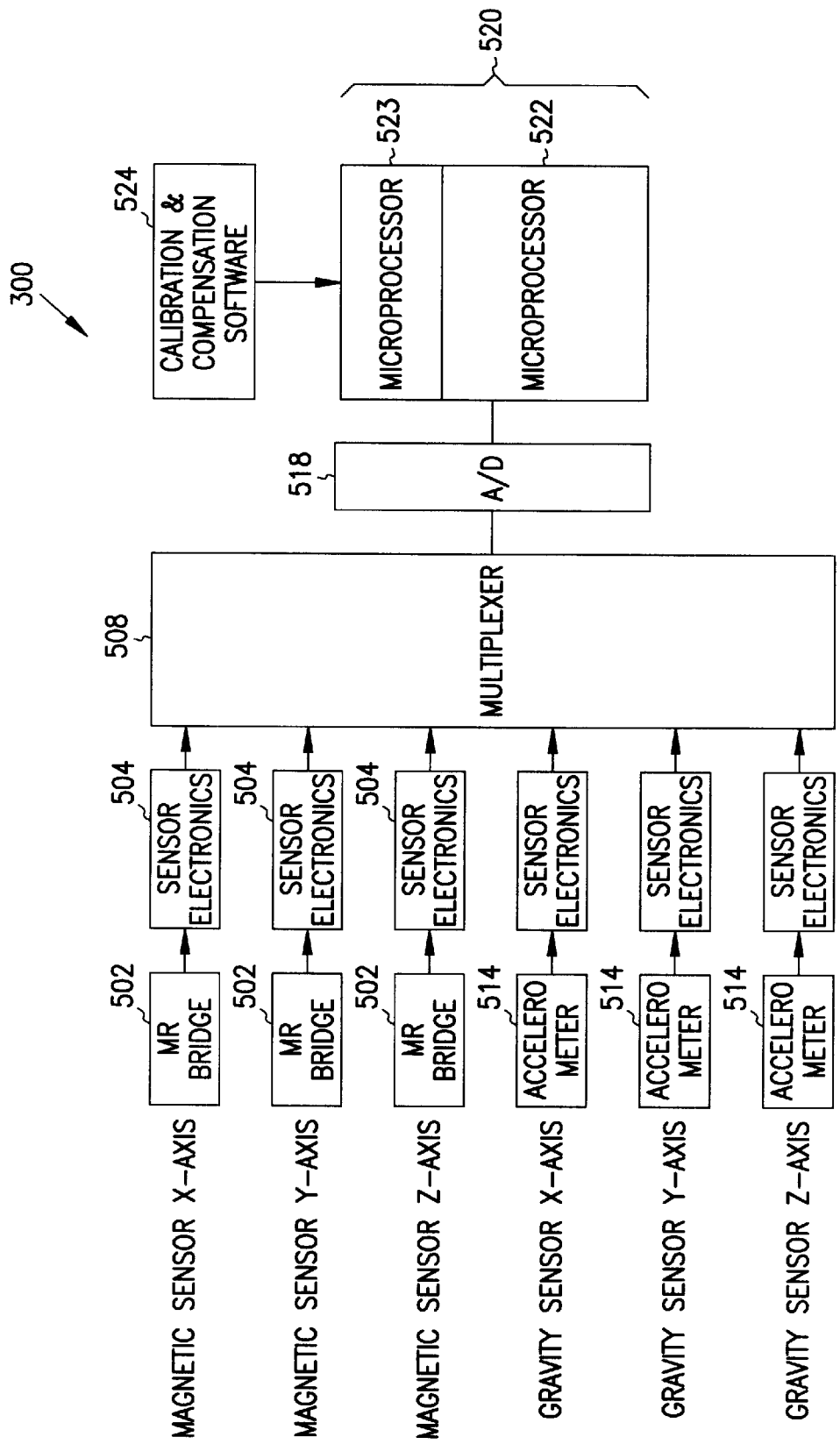
FIG. 5 is a block diagram illustrating a particular embodiment of the electronic compass of FIG. 3, according to another embodiment of the present invention.

FIG. 5 illustrates a particular implementation of the electronic compass 300 depicted more generally in FIG. 3. Magnetic sensors 502 formed by magnetoresistive (MR) bridges obtain magnetic field measurements with respect to each of three coordinate axes of an internal coordinate system, such as the coordinate system depicted in FIG. 4. MR bridges are particularly suitable for implementing the magnetic sensors 502 due to their small size and low power requirements. The magnetic sensors 502 are fixed with respect to the vehicle or equipment on which the electronic compass 300 is mounted. The measurements are provided to sensor electronics modules 504, which may also be implemented, for example, using other conventional types of sensor electronics that are well-known in the art. The outputs of the sensor electronics modules 504 are provided to a multiplexer 508, which samples each in turn.

In the particular implementation depicted in FIG. 5, the multiplexer 508 also receives acceleration information from accelerometers 514. These accelerometers 514 measure acceleration and gravity along each of the three axes of the internal coordinate system of the electronic compass.

The multiplexer 508 provides the magnetic sensor and accelerometer signals to an analog-to-digital (A/D) converter 518, which converts the signals in turn to digital data and provides the converted data to a microprocessor arrangement 520 having a microprocessor 522 and a memory 523. The microprocessor arrangement 520 uses this information to compute the azimuth angle. Due to magnetic errors, however, if not compensated, the azimuth will typically not be correct.

To correct the measured magnetic fields, the microprocessor 522 processes the data in a manner directed by software 524 loaded in the memory 523 associated with the microprocessor 522. This software 524 implements the routines for calibrating the electronic compass 300, performing magnetic compensation once the magnetic compass 300 has been calibrated, and calculating the magnetic azimuth after performing the magnetic compensation. As a result of the compensation process, the microprocessor 522 calculates the azimuth angle, which is output to the user via, for example, a conventional RS-232 data interface.

To determine the Earth's magnetic field $H_{EARTH}$ from the measured magnetic field $H_{MEAS}$, the algebraic inverse of the physical model expression $$H_{MEAS} = M \cdot H_{EARTH} + H_{PERM}$$

is used to compensate for magnetic errors. This algebraic inverse takes the form $$H_{EARTH} = M^{-1} \cdot [H_{MEAS} - H_{PERM}]$$

The coefficients can be expressed in a slightly different form with the definitions:

$$L_E = M^{-1}$$

$$H_{PE} = M^{-1} \cdot H_{PERM}$$

The above formula thus becomes:

$$\hat{H}_{EARTH} \equiv L_E \cdot H_{MEAS} - H_{PE}$$

In this formula, $\hat{H}_{EARTH}$ is the goal, accurate estimated values for the Earth's true magnetic field, calculated in real time from the magnetometer output, $H_{MEAS}$. The matrix $L_E$ and the vector $H_{PE}$ are numerical compensation coefficients.

By determining the values of these coefficients, the need to calculate the original model parameters, M and $H_{PERM}$, is obviated.

Once $L_E$ and $H_{PE}$ are determined, the above formula is valid for any orientation in three-axis space, and the electronic compass can be used as a fully three-axis compass. Because the formula is based on a physical model, no approximations are used in arriving at this compensation formula, which is valid for magnetic perturbations of any magnitude and for any strength of the Earth's magnetic field. Further, compensation depends only on $H_{MEAS}$ and does not require any external information, such as knowledge about the Earth's magnetic field, gravity vector, or local level. Once the compass is calibrated, it can be used anywhere in the world, regardless of magnetic latitude.

In the compensation formula of this invention, the nine elements of matrix $L_E$ are in fact the nine values as needed to fully compensate all the nine types of errors associated with $H_{INDUCED}$ and the susceptibility matrix, K, as known in the prior art and described here. In addition, the three elements of the vector $H_{PE}$ are the required three values for compensating for $H_{PERM}$. Therefore, with appropriate values for the twelve elements, the compensation formula is then capable of compensating all types of errors arising from the perturbing magnetic fields.

As described for matrix K, there are no special properties which can be ascribed to matrix $L_E$. In particular matrix $L_E$ will not be symmetric, nor will it have other properties, which reduce the number of independent values needed to fully compensate all the nine types of errors. In the prior art for compensating electronic compasses simplifying approximations have sometimes been made which are equivalent to assuming that matrix $L_E$ is symmetric and requiring only six element values for its specification. In other cases additional assumptions are also made for the purpose of further reducing the number of coefficients which need to be determined, say to four values. The purpose was to simplify the algebra and their calculation from some calibration procedure. With modem microprocessors and memory there is no longer the motivation for simplification there once was. Any compensation method, which is equivalent to assuming a symmetric matrix for $L_E$, or any additional simplifications, cannot compensate for all of the nine types of errors associated with the $H_{INDUCED}$ perturbations. Such a compensation method is incomplete. This invention in particular teaches a method for determining all nine values in the compensation coefficient matrix $L_E$ and for fully compensating for all errors.

Because $L_E$ is a 3×3 matrix and $H_{PE}$ is a three-axis vector, compensating the compass using this formula requires determining twelve real-valued elements of these coefficients. The accuracy of the compensation depends on the accuracy of the coefficients. Therefore, it is particularly beneficial to obtain accurate coefficients.

These coefficient values are determined using any of a variety of calibration processes. Preferably, calibration is formulated using as a reference the internal coordinate system of the compass so as to emphasize the viewpoint of the sensors as opposed to the user's Earth-based coordinate system. The internal coordinate system of the compass is shown in FIG. 4, with axes defined in the x, y, and z directions. In this system, the Earth's magnetic field vector $H_{EARTH}$, which has a constant magnitude, and the gravity unit vector G together form a rigid pair with a constant angle between them. These vectors can have any orientation with respect to the x, y, and z axes, which form the only coordinate system required. It should be noted that the Earth's coordinate system is not needed for the calibration procedure.

Figure 6A:
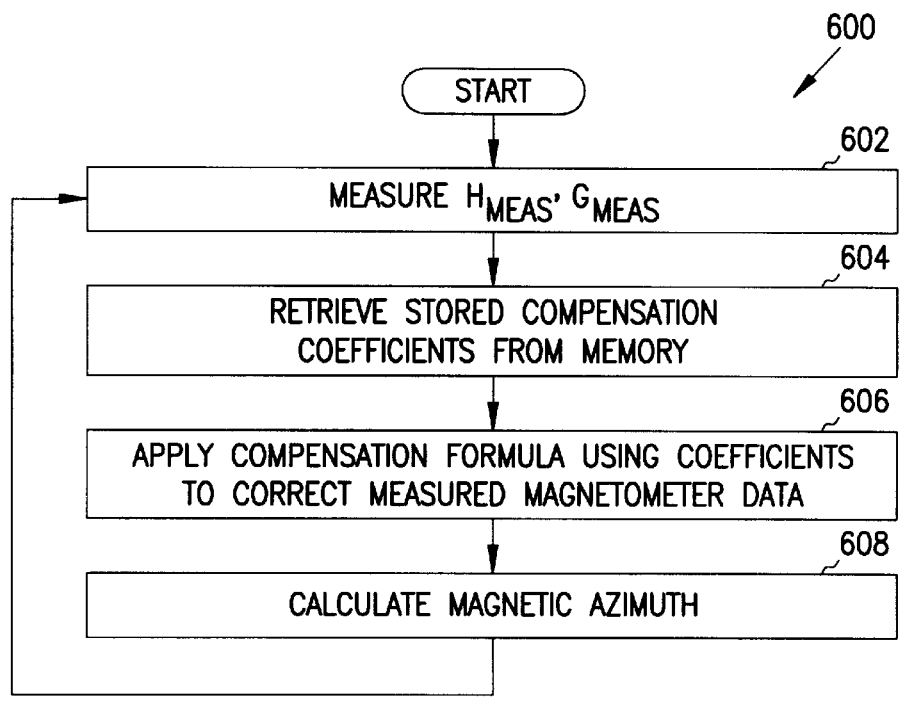
FIG. 6A is a flowchart illustrating an example method for compensating an electronic compass, according to still another embodiment of the present invention.

FIG. 6A is a flowchart illustrating an example method 600 for compensating the electronic compass 300, according to another embodiment of the present invention. Compensation is performed during normal operations of the electronic compass. First, starting at a block 602, a three-axis magnetic field vector $H_{MEAS}$ and a three-axis gravity vector $G_{MEAS}$ are measured. Next, at a block 604, compensation coefficients, i.e., the matrix coefficient $L_E$ and the vector coefficient $H_{PE}$, are retrieved from a memory associated with the electronic compass 300. These compensation coefficients are obtained, for example, as described below in connection with FIG. 6B. As depicted at a block 606, the compensation formula $$\hat{H}_{EARTH} = L_E \cdot H_{MEAS} - H_{PE}$$

is applied using the retrieved values of the matrix coefficient $L_E$ and the vector coefficient $H_{PE}$. Applying the compensation formula corrects the magnetometer data for magnetic errors. Based on the corrected magnetometer data, the magnetic azimuth is then calculated at a block 608. Flow then returns to the block 602, and the process is repeated.

Figure 10A:
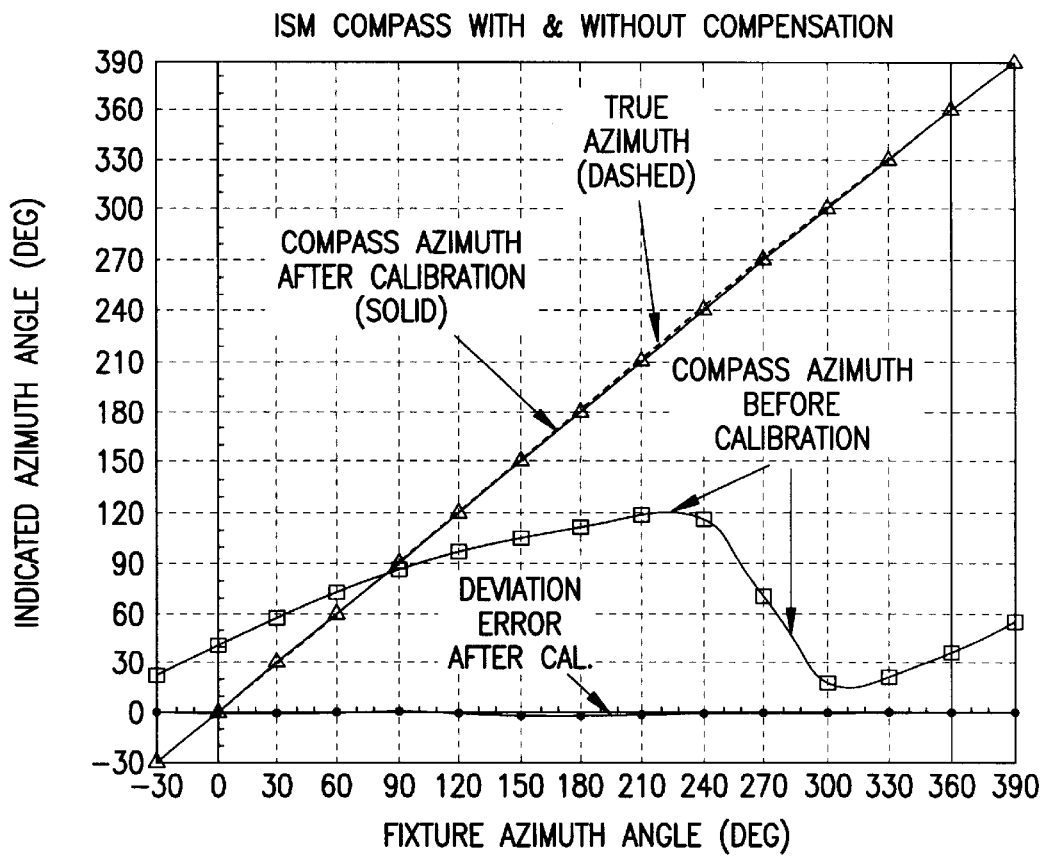
FIG. 10 illustrates the effect on electronic compass accuracy of numerical compensation performed using a compensation method according to an embodiment of the present invention.
Figure 10B:
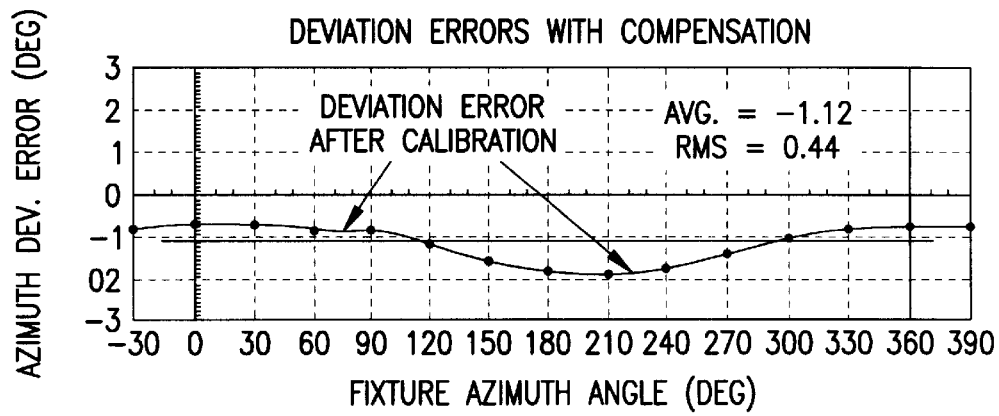

Compensating the electronic compass 300 in this manner allows the compass to be used at any orientation. In addition, all magnetic errors are compensated, even for magnetic perturbations that may be larger than the Earth's magnetic field. FIG. 10 illustrates the effectiveness of the present invention in compensating for very large magnetic perturbations.

Figure 6B:
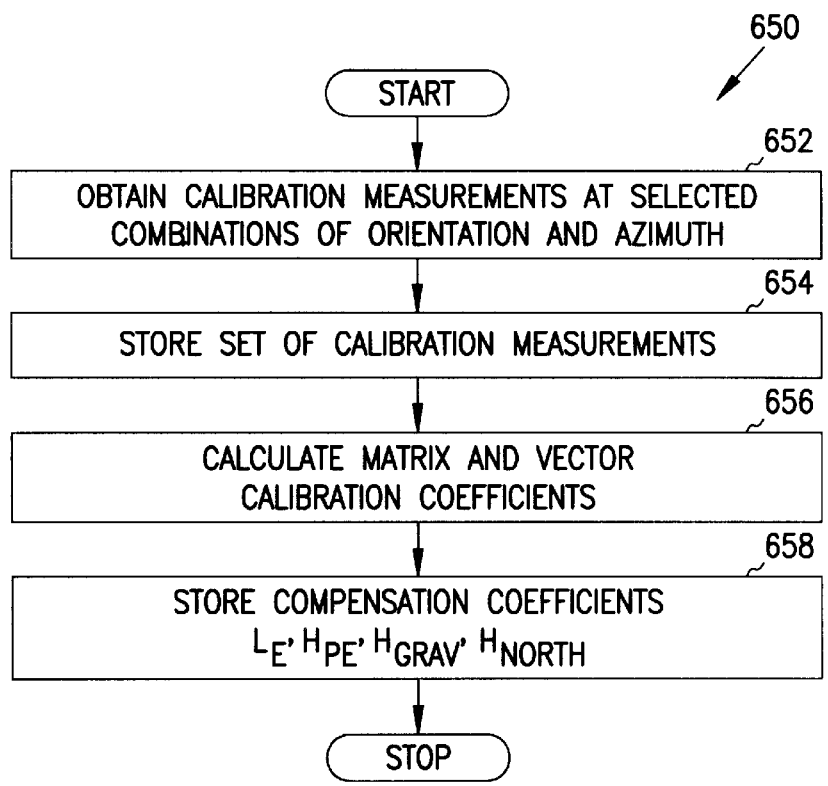
FIG. 6B is a flowchart illustrating an example method for calibrating an electronic compass, according to yet another embodiment of the present invention.
Figure 7:
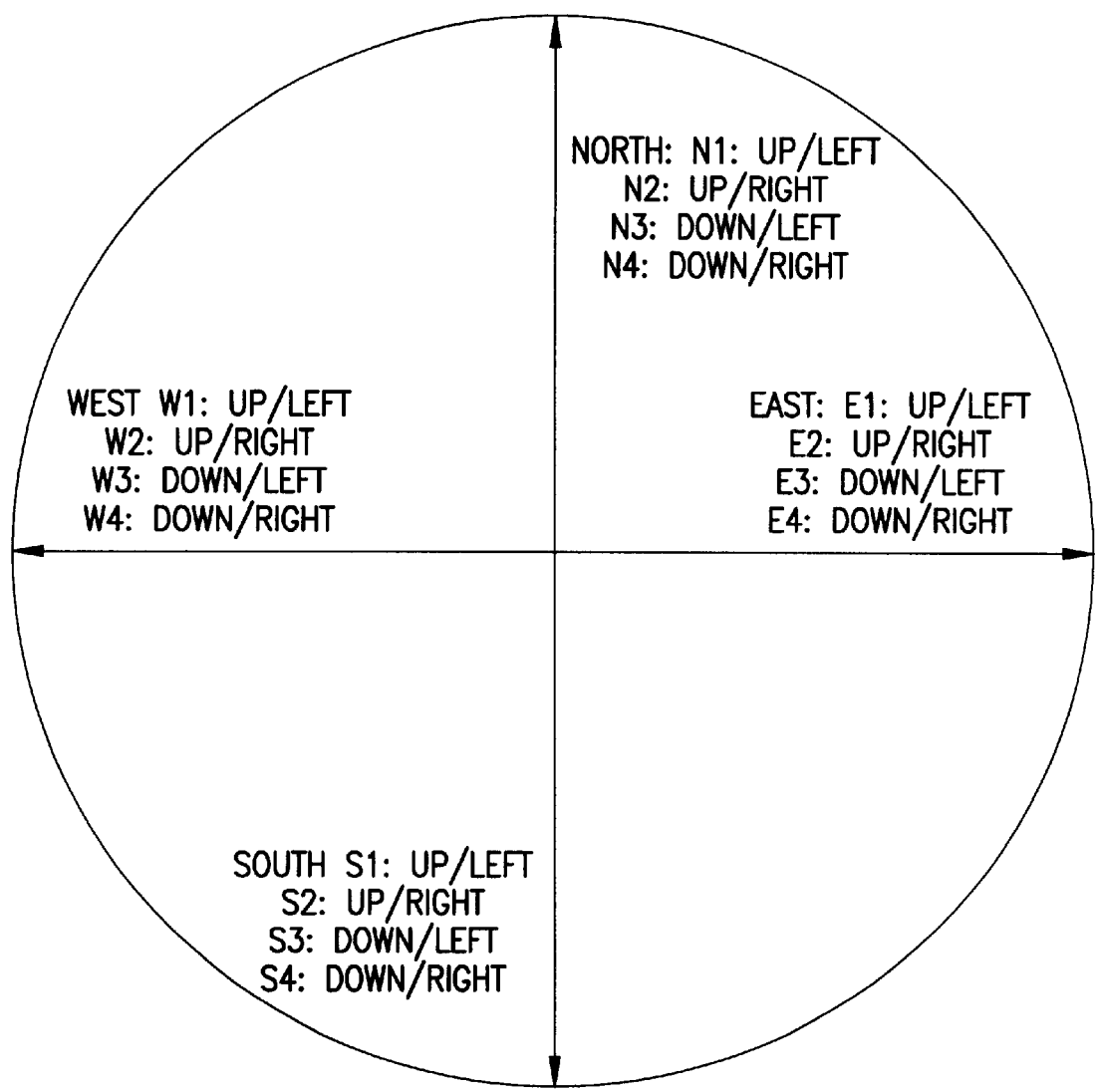
FIG. 7 illustrates a particular set of orientations used in calibrating an electronic compass, according to a particular embodiment of the present invention.

Before the electronic compass 300 can be compensated, however, it must be calibrated. Calibration involves determining the values of the matrix coefficient $L_E$ and the vector coefficient $H_{PE}$ to be applied in the compensation formula $$\hat{H}_{EARTH} = L_E H_{MEAS} - H_{PE}$$

and is typically only performed occasionally. FIG. 6B depicts an example method 650 for calibrating the electronic compass. First, starting at a block 652, calibration measurements, namely a three-axis magnetic field vector $H_{MEAS}$ and a three-axis gravity vector $G_{MEAS}$, are obtained at selected combinations of orientation and azimuth. The vectors $H_{MEAS}$ and $G_{MEAS}$ in each set of measurements are expressed in terms of unit vectors x, y, and z respectively corresponding to the x, y, and z axes of the coordinate system of the compass. According to one particular embodiment, measurements are taken for a set of four orientations (pitch and roll combinations) at each of four azimuths, e.g., north, east, south, and west, as depicted in FIG. 7, for a total of sixteen measurements. It should be noted that the choice of particular azimuth angles is not important, as long as the azimuths are roughly 90° apart. For example, choosing azimuths corresponding to northwest, northeast, southeast, and southwest positions would work equally well. The same tilt orientations may be used at each azimuth. For example, the set of orientations can be selected as combinations of up/down pitch angle and left/right roll angle, i.e., up/left, up/right, down/left, and down/right, where the pitch and roll angles are all approximately 30°. It should be noted that, as with the azimuth angles, the pitch and roll angles are not critical. Further, the calibration procedure is completely independent of the order in which measurements are taken. It is, however, important to maintain the compass in a steady orientation during the measurement process to obtain accurate measurements and calibration, particularly for G. Calibration accuracy is also improved by ensuring that the measurements are well distributed in terms of azimuth, pitch, and roll angles. In other implementations, a set of twenty-four or thirty-two measurements may be used. The calibration measurements are then stored in a memory associated with the electronic compass 300 at a block 654.

Next, using the set of sixteen measurements thus obtained, i.e., the three-element vector $H_{MEAS}$ and the three-element vector $G_{MEAS}$ for each of sixteen combinations of pitch and roll angles, a set of equations is then formulated and solved to determine $L_E$ and $H_{PE}$, as depicted at a block 656 of FIG. 6B. For each measurement of $H_{MEAS}$ in the calibration measurement set, it is taken that $$\hat{H}_{EARTH} = L_E \cdot H_{MEAS} - H_{PE}.$$

Moreover, over all measurements, $H_{EARTH}$ has a fixed but unknown magnitude and dip angle. These properties lead to a system of equations that is used to calculate the coefficients.

First, $\hat{H}_{EARTH}$ has a fixed magnitude $H_0$. Thus, the square of the magnitude is also constant:

$$|\hat{H}_{EARTH}|^2 = H_0^2.$$

Combining this equation with the above equation for each set of measurements leads to the following equation for each value of the set of recorded calibration measurements:

$$(L_E \cdot H_{MEAS} - H_{PE}) \cdot (L_E \cdot H_{MEAS} - H_{PE}) = H_0^2$$

where $H_0^2$ is an unknown constant, the squared magnitude of the Earth's magnetic field. Assuming a set of sixteen measurements is taken, a set of sixteen equations of the above form can be derived. In this set of equations, the values of $G_{MEAS}$ are not used. These equations are quadratic in the unknown coefficients $L_E$ and $H_{PE}$.

Second, the constant dip angle implies that the vector dot product for all measurements in the set $$G_{MEAS} \cdot \hat{H}_{EARTH} = H_{GRAV}$$

where $H_{GRAV}$ is an unknown constant having the same value for all measurements, the vertical component of the Earth's magnetic field. Thus, $$G_{MEAS} \cdot (L_E \cdot H_{MEAS} - H_{PE}) H_{GRAV}$$

for each measurement in the set. Again assuming a set of sixteen measurements is taken, a set of sixteen vector equations of the above form can be stated. These latter equations are linear in the unknown coefficients. Together, the sixteen quadratic equations and sixteen linear equations:

$$(L_E \cdot H_{MEAS} - H_{PE}) \cdot (L_E \cdot H_{MEAS} - H_{PE}) = H_0^2$$

$$G_{MEAS} \cdot (L_E \cdot H_{MEAS} - H_{PE}) = H_{GRAV}$$

form a single system of thirty-two equations in fourteen unknown quantities—the nine components of $L_E$, the three of $H_{PE}$, as well as $H_0$, and $H_{GRAV}$—and in ninety-six known, measured, quantities, namely, the three components of $H_{MEAS}$ and the three components of $G_{MEAS}$ for each of the sixteen measurements. The equations are homogeneous in the unknown quantities, and there are no error-free fixed source values that can be substituted for $H_0^2$ and $H_{GRAV}$. While the ratio of $H_{GRAV}$ to $H_0$ is significant, their magnitudes are not. Thus, the quantities $H_0^2$ and $H_{GRAV}$ and the unknown coefficients can be arbitrarily normalized, reducing the number of unknown quantities from fourteen to thirteen.

Before turning attention to solving the system of equations, it should be appreciated that the use of a set of sixteen measurements of $H_{MEAS}$ and $G_{MEAS}$ is exemplary rather than mandatory. Fewer or more measurements may be used consistent with the present invention, though accuracy of calibration may be affected. For example, a set of twenty-four or thirty-two measurements will significantly improve the accuracy of the results.

Turning now to the method of solving the system of equations, the system of equations is restructured as a set of linear equations. In particular, the estimated $H_{EARTH}$ from each measurement is rotated into a north/east/down reference frame. This rotation involves an initial estimate for the coefficient values and three new parameters and yields a system of sixteen equations for each of the north, east, and down components, i.e., forty-eight equations in all.

In particular, to rotate the estimated $H_{EARTH}$ into the north/east/down frame, the following equation is used:

$$\begin{bmatrix} H_{NORTH} \\ H_{EAST} \\ H_{DOWN} \end{bmatrix} = \begin{bmatrix} \cos\psi & \sin\psi & 0 \\ -\sin\psi & \cos\psi & 0 \\ 0 & 0 & 1 \end{bmatrix} \cdot R_1(\theta) \cdot R_2(\phi) \cdot [L_E \cdot H_{MEAS} - H_{PE}]$$

where $R_1(\theta)$ and $R_2(\phi)$ are derived from each $G_{MEAS}$ value, and $H_{MEAS}$ is the corresponding magnetometer value. $\psi$ is a quantity that is calculated such that $H_{EAST}$ is zero for each measurement. The above equation is linear in the unknown variables $H_{EARTH}$, $L_E$, and $H_{PE}$. The subset of sixteen equations for $H_{DOWN}$ is the same subset that was used before for $H_{GRAV} = G_{MEAS} \cdot \hat{H}_{EARTH}$.

Of these equations, the sixteen "down" equations are truly linear in the unknown coefficients $L_E$, $H_{PE}$, and $H_{DOWN}$, and can be solved for these values using standard algorithms known in the art. To facilitate reference to these sixteen equations, they are collectively denoted the "A" equations. The full set of forty-eight equations, including the "A" equations, are similarly collectively denoted the "B" equations. The values of $L_E$ and $H_{PE}$ determined by first solving the "A" equations are then used in solving the larger "B" system of equations for refined values of $L_E$ and $H_{PE}$.

For purposes of compass calibration, the measured values for $H_{MEAS}$ and $G_{MEAS}$ are in fact known, while the compensation coefficients $L_E$ and $H_{PE}$ are the unknowns. For each of the sixteen measurements, a pair of $H_{MEAS}$ and $G_{MEAS}$ values are recorded.

As discussed above, the compensation formula to be satisfied by these quantities is:

$$H_E = L_E \cdot H_M - H_{PE}$$

where $H_E$ represents the unknown Earth's magnetic field, which is the same for all measurements. Although in any Earth-fixed coordinates $H_E$ is a fixed vector, in the internal coordinate system, the numerical value of $H_E$ will be different for each measurement because of the different orientations during calibration.

To form a system of equations to be solved for the unknown compensation coefficients, this equation is in effect written sixteen times, once for each measurement of $H_{MEAS}$ and $G_{MEAS}$. However, for standard numerical methods, it is necessary to restructure the equations suitably; this requires all the unknowns to be formed as elements of a column vector and multiplied by a large system matrix of known values. The restructuring is done by the following steps.

For example, sixteen linear equations are obtained by forming the vector dot product of $G_{MEAS}$ and $H_E$. The result is the vertical-down component of Earth's field, $H_{GRAV}$, which has an unknown value but is identical for all measurements. The equation is written as follows:

$$G'_M \cdot H_E = G'_M [L_E \cdot H_M - H_{PE}] = H_G.$$

Next, the matrix $L_E$ is written in terms of its three column vectors as $$L_E = [L_{EX} | L_{EY} | L_{EZ}],$$

and then the above system equation for $H_{GRAV}$ becomes, for any one pair of measured $H_{MEAS}$ and $G_{MEAS}$, $$\left[ G_M \cdot [L_{EX} | L_{EY} | L_{EZ}] \cdot \begin{bmatrix} H_{MX} \\ H_{MY} \\ H_{MY} \end{bmatrix} - G'_M \cdot H_{PE} \right] = H_G.$$

This is a scalar equation, as the $H_{GRAV}$ on the right is a single number, not a vector. The first product of $G_{MEAS}$ on the left is in fact the product of $G_{MEAS}$ and each of the three columns of $L_E$, resulting in a row vector, which then multiplies the column vector of the measured $H_M$.

With the objective of collecting all the unknowns into a longer column vector, this equation is rearranged into an entirely equivalent form as $$[H_{MX} G'_M | H_{MY} G'_M | H_{MZ} G'_M | -G'_M | -1] \cdot \begin{bmatrix} L_{EX} \\ L_{EY} \\ L_{EZ} \\ H_{PE} \\ H_G \end{bmatrix} = 0.$$

The row vector on the left involves all measured values, and is different for each measurement; the column vector on the right, denoted as P, is composed of all the unknown compensation coefficients and is common to all measurements. Both are thirteen-element vectors. The zero on the right is a single element, not a vector.

This equation can be written simply as A·P=0, where P is the vector of coefficients to be determined and A is the row vector composed of measured values.

When this equation is written for each of the sixteen measurements, all different because of the varied orientations used for the calibration procedure, then the A vector becomes instead a large 16×13 system matrix, one row for each measurement. This system is designated as the "A" system of equations and is linear in the unknowns. The "A" system is solved for the coefficients. The "A" system, however, is not the full system and does not provide for the complete solution. By itself, it provides only a first approximation.

The full system of equations requires appending to vector P either the squared magnitude of $H_E$ or the level-north component of $H_E$, as in previously described methods. For the resulting larger system, the same steps as just described for the "A" system are used to formulate the full system of equations, with a fourteenth element added to the P vector. Together, the system constitutes thirty-two equations in fourteen unknowns.

In addition, as described, the use of rotations of each $H_E$ into North, East, and Down components may instead be used, resulting in these becoming the last three elements of the P vector, fifteen in total. The full system then comprises forty-eight equations in fifteen unknown coefficients. All of these alternative systems of equations have been demonstrated as calibration calculation methods for determination of the compensation coefficients.

When a solution is obtained for the vector P, its element values are recast as the compensation coefficients and the appropriate components for Earth's field. Specifically, the first nine values of vector P are taken to be the three columns of matrix $L_E$, the next three are taken to be the vector $H_{PE}$. The remaining elements are taken to be the appropriate values for components of Earth's field, which particular ones depending on the calculation formulation and system of equations used.

It is understood that the use of sixteen measurements is merely provided by way of example and not limitation; any larger number may be used without altering the structure of the system of equations, and will result in greater accuracy. A minimum of twelve measurements is needed to obtain a solution, which will then be less accurate. Calibration procedures based on 20, 24, 32 or even 40 measurements are advantageous for increased accuracy.

It is also understood that the order in which the measurements are incorporated or used in the system of equations makes no difference in the solutions obtained. This has a very significant practical advantage, in that it does not matter in what order the measurements are taken in the calibration procedure.

A further advantage of the calibration method is that no additional values are needed beyond the pairs of measured values $H_{MEAS}$ and $G_{MEAS}$. Specifically, there is no need to supply numbers to the system equations for the pitch and roll tilt angles and azimuth angles at which the measurements were obtained. A calibrated compass test range is not needed, nor even one sighting at a known azimuth.

In an example embodiment of the present invention, the "A" and "B" systems of equations are solved, for example, using a computer language such as MATLAB®, commercially available from The Math Works, Inc. Both systems are, according to this embodiment, solved using singular value decomposition (SVD) techniques, as follows. Accompanying this disclosure is an appendix containing further enabling material, which gives more detail of the methods for carrying out the calibration calculations. These are listings of MATLAB® programs that may be used in prototyping these algorithms which are herein claimed.

A set of N linear equations in M unknowns can be written in matrix form as $$A \cdot P = 0 + \delta$$

where the system matrix A is an N×M matrix and P is an M-element column vector representing the M unknowns. For an over-determined system, that is, one in which N>M, matrix A is not square and does not have an inverse or a unique solution for P. Therefore, the matrix product A·P produces at best an N-element column vector $\delta$ of residuals.

The best solution for the vector P is determined by solving the above system of simultaneous equations using a least-squares approach to minimize $|\delta|^2$, which is inherent in the use of the SVD.

The singular value decomposition (SVD) of a non-square matrix A is a factorization into three matrices, U, S, and V, such that:

$$_N A^M =\ _N[U]^N \cdot_N[S]^M \cdot_M[V]^M$$

where S is a matrix of singular values diaganol in its upper left square M×M block. Some of these singular values may be zero. U and V are square orthogonal or unitary matrices; that is, U'·U≡$I_N$ and V'·V≡$I_M$. Any of a variety of numerical software algorithms known in the art can be used to calculate these three matrices. Once these matrices are calculated, the complete least squares solution for the unknowns P is obtained from the smallest singular value, the last element $S_{MM}$ of the matrix S (as conventionally ordered), as well as the Mth column vectors of the matrices U and V. Specifically, the minimized root sum squared (RSS) residuals value σ is $$\sigma = S_{MM}$$

The solution vector P for the unknown values is given by $$P = V_M$$

That is, the Mth column of the SVD matrix factor V. The solution vector P is an M×1 column vector that can be renormalized as desired. Finally, the equation residuals δ is an N×1 vector proportional to σ and given by $$\delta = \sigma \cdot U_M.$$

The other element values of the U, S, and V matrices are not of interest and are discarded.

Figure 8A:
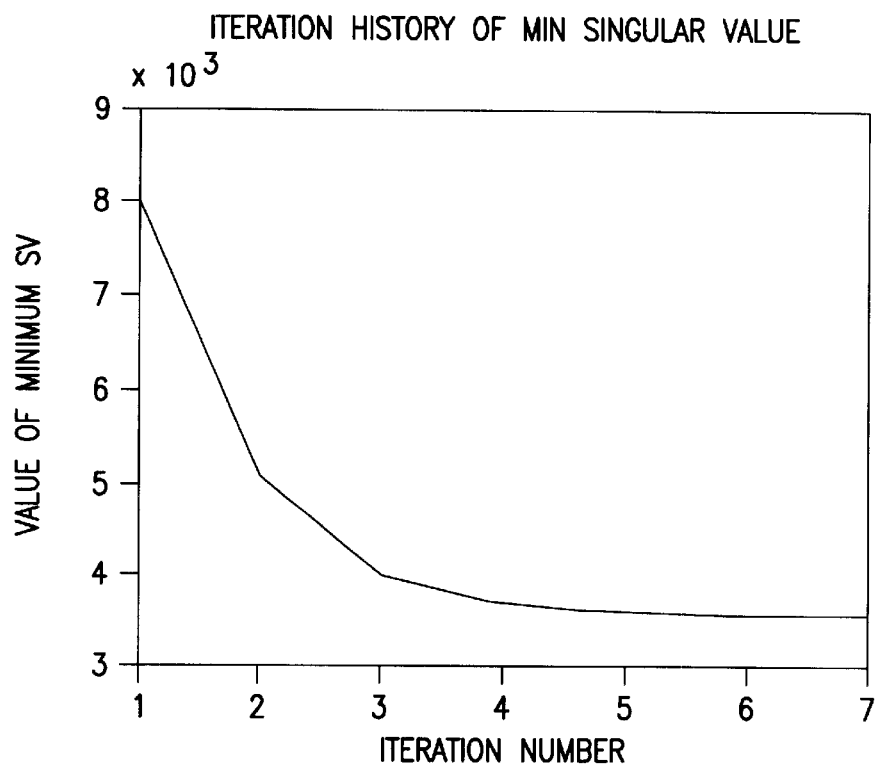
FIG. 8 is a set of two graphs depicting smallest singular values and convergence of a solution set of numerical compensation coefficients obtained using a calibration method according to one particular embodiment of the present invention.
Figure 8B:
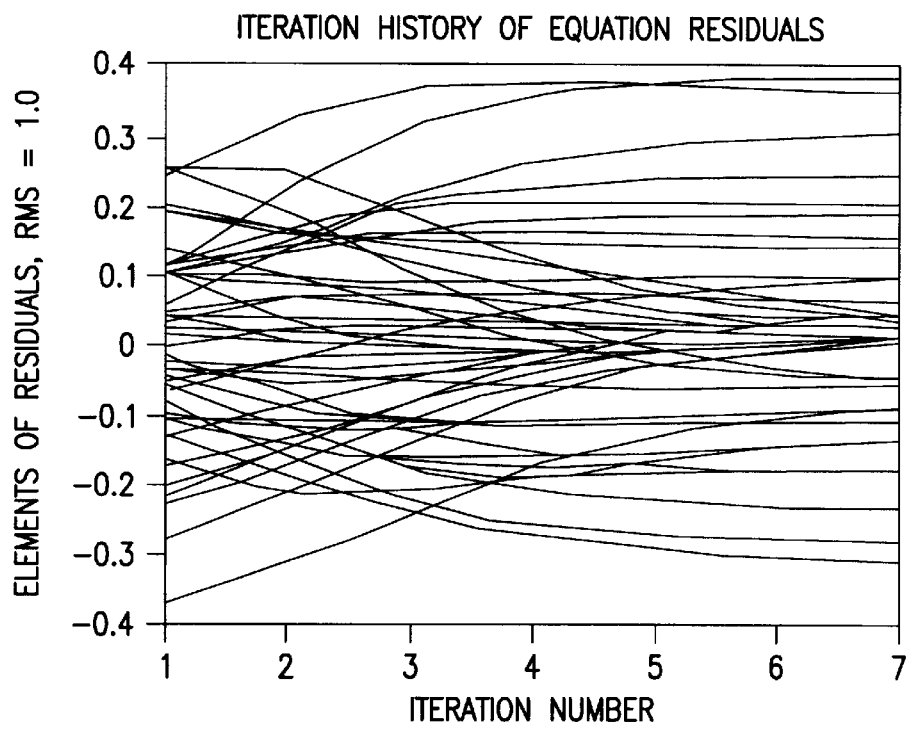

The solution vector P is parsed back into the values for the matrix coefficients $L_E$ and $H_{PE}$. That is, the components of the solution vector P are read into the element values of $L_E$, $H_{PE}$, $H_{NORTH}$, $H_{EAST}$, and $H_{DOWN}$. The matrix coefficient $L_E$ and the vector coefficient $H_{PE}$ having been thus obtained, calibration of the electronic compass is complete. In a particular embodiment, the "B" system is solved iteratively to provide more accurate coefficients $L_E$ and $H_{PE}$. FIG. 8 illustrates smallest singular values and convergence with successive iterations.

Figure 9A:
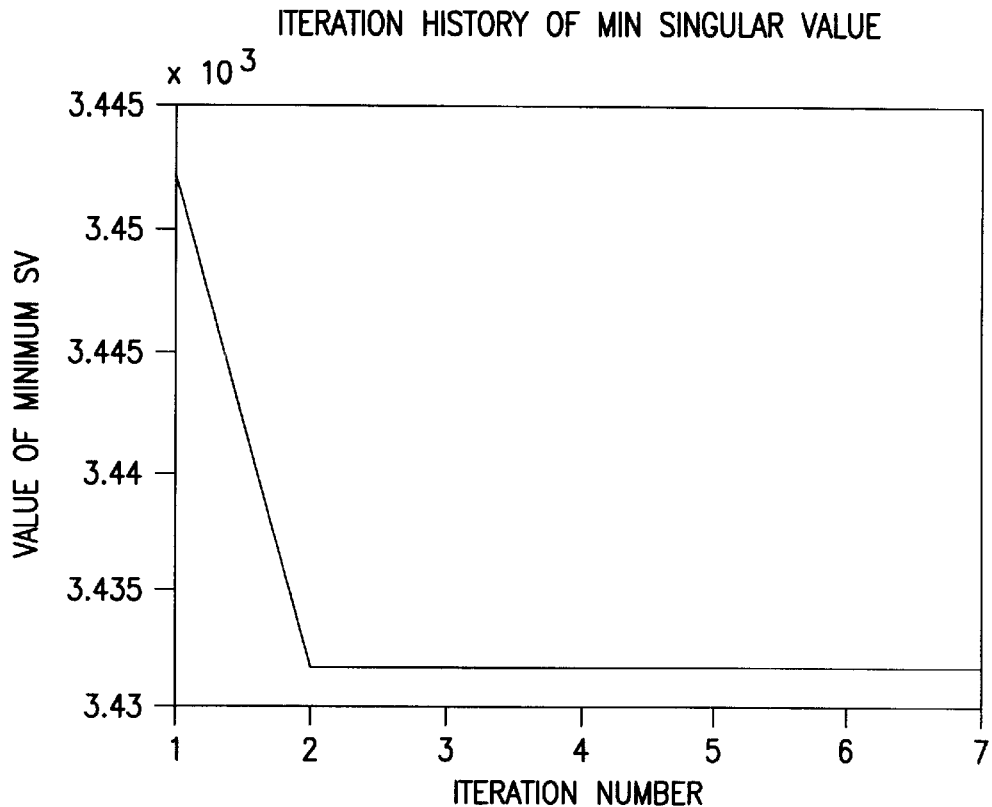
FIG. 9 is a set of two graphs depicting smallest singular values and convergence of a solution set of numerical compensation coefficients obtained using a calibration method according to another particular embodiment of the present invention.
Figure 9B:
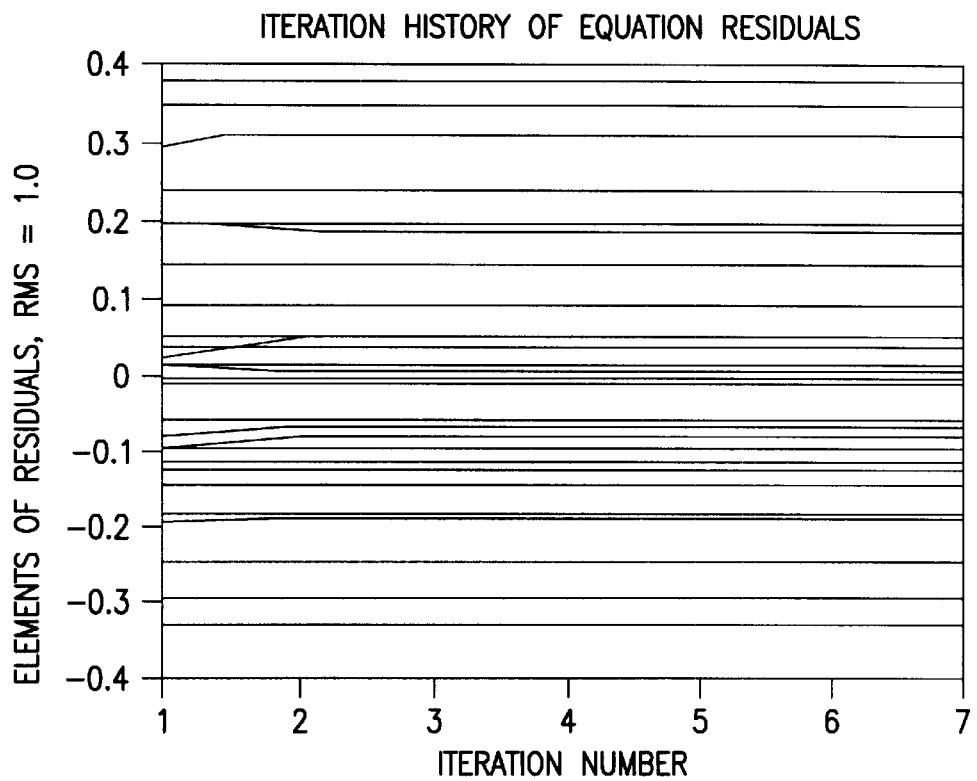

It has been observed that the "East" equations have zero for solutions and small residuals. Thus, according to another embodiment, these "East" equations are eliminated from the "B" system to advantageously improve convergence. The "B" system in this embodiment is redefined as a 32×14 system, with unknowns for $H_{NORTH}$ and $H_{DOWN}$ forming part of the solution set. The "A" system of sixteen equations in thirteen unknowns is first solved to yield a first estimate of the coefficients $L_E$ and $H_{PE}$. These results are then used to solve the "B" system of thirty-two equations in fourteen unknowns to obtain refined values of $L_E$ and $H_{PE}$. Next, the "B" system is solved again to further refine $L_E$ and $H_{PE}$. In this embodiment, adequate convergence can be obtained in only two iterations, as illustrated in FIG. 9.

In another embodiment of the present invention, the measurements are used to derive an alternative set of equations for determining $L_E$ and $H_{PE}$. As described above, for each individual measurement, the estimated value of the Earth's magnetic field vector $\hat{H}_{EARTH}$ is given formally by:

$$\hat{H}_{EARTH} = L_E \cdot H_{MEAS} - H_{PE}.$$

Another equivalent fundamental property of the Earth's magnetic field is used to derive these alternative equations. Specifically, over all measurements, the vertical and level (North) components of $\hat{H}_{EARTH}$ are each constant. Because the vertical component is constant, the vector dot product $$G_{MEAS}' \cdot \hat{H}_{EARTH} = H_{GRAV}$$

where $H_{GRAV}$ is an unknown constant. Combining these equations for each of the sixteen measurements yields the following system of equations:

$$G_{MEAS}' \cdot (L_E \cdot H_{MEAS} - H_{PE}) = H_{GRAV}.$$

The constant level or north component leads to the following equation for each of the sixteen measurements:

$$\text{Level}(L_E \cdot H_{MEAS} - H_{PE}) = H_{NORTH}$$

where $H_{NORTH}$ is an unknown constant.

Thus, a system of thirty-two equations is defined; these equations are then solved for values of $L_E$ and $H_{PE}$, $H_{GRAV}$, and $H_{NORTH}$ using, for example, computer-implemented numerical methods. The equations $$G_{MEAS}' \cdot (L_E \cdot H_{MEAS} - H_{PE}) = H_{GRAV}.$$

are linear in the unknown coefficients and are solved initially. The equations $$\text{Level}(L_E \cdot H_{MEAS} - H_{PE}) = H_{NORTH}$$

need initial estimates of $L_E$ and $H_{PE}$ in order to calculate the level components. Rotations are calculated about $G_{MEAS}$ in a manner similar to that described above for calculating the rotation of estimated $H_{EARTH}$ into the north/east/down reference frame.

Next, all of the equations are solved together as a single system of thirty-two linear equations. Solving the equations is performed in substantially the same manner as described above in connection with the "A" and "B" systems. That is, the first sixteen equations of the form $$G_{MEAS}' \cdot (L_E \cdot H_{MEAS} - H_{PE}) = H_{GRAV}$$

are first solved to obtain preliminary estimates of $L_E$ and $H_{PE}$, which are then used to solve the larger system of equations to obtain another estimate of $L_E$ and $H_{PE}$. The larger system is solved again to further refine the estimates of $L_E$ and $H_{PE}$. It has been observed that only two iterations are involved in obtaining adequate convergence values for $H_{GRAV}$ and $H_{NORTH}$. After completion of the calibration calculations the resulting coefficients are stored in the memory 532, as indicated at block 658 of FIG. 6B.

Returning to FIG. 6A, during normal operation of the compass, measurements are continuously and repeatedly made of $H_{MEAS}$ and $G_{MEAS}$, as indicated at block 602. The values for the compensation coefficients $L_E$ and $H_{PE}$ are retrieved from the memory in connection with block 604, and flow proceeds to a block 606, at which these coefficients are used to correct measured magnetometer output data to arrive at the accurate azimuth data. In particular, the matrix compensation coefficient $L_E$ and the vector compensation coefficient $H_{PE}$ are used in the formula $$\hat{H}_{EARTH} = L_E \cdot H_{MEAS} - H_{PE}$$

to obtain $\hat{H}_{EARTH}$, the objective, estimated values for the Earth's true magnetic field, from the measured magnetometer output data vector $H_{MEAS}$.

By compensating the electronic compass as described above, a user can employ the compass at any orientation. Moreover, all magnetic errors, including magnetic perturbations larger than the Earth's magnetic field, are compensated.

Certain additional benefits are observed from the calibration method described. Besides compensating for magnetic errors, the compensation techniques described above also compensate exactly for several types of sensor errors relating to the magnetometer sensors. For example, sensor bias offsets are entirely analogous to permanent magnetic field perturbations and are accounted for in the $H_{PE}$ coefficient. Certain other magnetometer sensor errors, including unequal scale factors, axis alignment and nonorthogonality, and misalignment of the magnetometer and accelerometer axes are entirely analogous to induced field magnetic perturbations and are accounted for in the $L_E$ coefficient. All these such errors are fully and accurately compensated for in the compensation method and calibration procedure of the present invention.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims. For instance, the values of the compensation coefficients can be continuously updated as the compass is used. Further, various filters, such as Kalman filters, can be used in the calibration process.

What is claimed is:

1. A method of compensating an electronic compass to obtain accurate azimuth data for any orientation of the electronic compass despite the presence of perturbing magnetic effects, the method comprising:

obtaining a measured magnetic field vector $H_{MEAS}$ representing magnetic field strength along three axes and a measured gravity vector $G_{MEAS}$ representing gravitational field strength along the same three axes;

using a matrix compensation coefficient $L_E$ and a vector compensation coefficient $H_{PE}$ to correct measured magnetic field data by applying a formula of the form $\hat{H}_{EARTH} = L_E \cdot H_{MEAS} - H_{PE}$, where $\hat{H}_{EARTH}$ is the compensated value for the Earth's true magnetic field; and calculating the azimuth data as a function of the corrected magnetic field data.

2. The method of claim 1, further comprising, before using the matrix compensation coefficient $L_E$ and the vector compensation coefficient $H_{PE}$ to correct measured magnetometer output data to obtain the accurate magnetic field data:

obtaining, for each of a plurality of combinations of orientations and azimuths, a measured magnetic field vector $H_{MEAS}$ representing magnetic field strength along three axes and a measured gravity vector $G_{MEAS}$ representing gravitational field strength along three axes; and calculating, as a function of the plurality of measured magnetic field vectors $H_{MEAS}$ and the plurality of measured gravity vectors $G_{MEAS}$, a matrix compensation coefficient $L_E$ and a vector compensation coefficient $H_{PE}$ by solving a system of equations.

3. The method of claim 2, wherein the plurality of measured magnetic field vectors $H_{MEAS}$ and the plurality of measured gravity vectors $G_{MEAS}$ are measured at four orientations for each of four azimuths, the orientations and azimuths being substantially evenly distributed in all angles.

4. The method of claim 3, wherein the four orientations are substantially similar for each of the four azimuths.

5. The method of claim 2, further comprising storing a plurality of component values of the matrix compensation coefficient $L_E$ and of the vector compensation coefficient $H_{PE}$ in a memory associated with the electronic compass.

6. The method of claim 2, wherein the system of equations comprises a plurality of equations of the form $$(L_E \cdot H_{MEAS} - H_{PE})^t \cdot (L_E \cdot H_{MEAS} - H_{PE}) = H_0^2$$

wherein $H_0$ is the magnitude of $\hat{H}_{EARTH}$, and further comprises equations of the form $$G_{MEAS} \cdot (L_E \cdot H_{MEAS} - H_{PE}) = H_{GRAV}$$

wherein $H_{GRAV}$ is a constant but unknown vertical component of $\hat{H}_{EARTH}$.

7. The method of claim 2, further comprising deriving a full system of equations by rotating $\hat{H}_{EARTH}$ for each of the plurality of measured magnetic field vectors $H_{MEAS}$ into a north/east/down coordinate frame of reference.

8. The method of claim 2, wherein the system of equations comprises a first subset of linear equations.

9. The method of claim 8, further comprising:

solving the first subset of linear equations to calculate an estimate of the matrix compensation coefficient $L_E$ and an estimate of the vector compensation coefficient $H_{PE}$; and using the estimate of the matrix compensation coefficient $L_E$ and the estimate of the vector compensation coefficient $H_{PE}$ to solve the full system of equations to calculate the matrix compensation coefficient $L_E$ and the vector compensation coefficient $H_{PE}$.

10. The method of claim 9, further comprising iteratively solving the system of equations to refine the calculated matrix compensation coefficient $L_E$ and the calculated vector compensation coefficient $H_{PE}$.

11. A method of compensating an electronic compass to obtain accurate azimuth data for any orientation of the electronic compass despite the presence of perturbing magnetic effects, the method comprising:

obtaining, for each of a plurality of combinations of orientations and azimuths, a measured magnetic field vector $H_{MEAS}$ representing magnetic field strength along three axes and a measured gravity vector $G_{MEAS}$ representing gravitational field strength along three axes;

calculating, as a function of the plurality of measured magnetic field vectors $H_{MEAS}$ and the plurality of measured gravity vectors $G_{MEAS}$, a matrix compensation coefficient $L_E$ and a vector compensation coefficient $H_{PE}$ by solving a system of equations;

storing a plurality of component values of the matrix compensation coefficient $L_E$ and of the vector compensation coefficient $H_{PE}$ in a memory associated with the electronic compass;

subsequently retrieving the plurality of component values of the matrix compensation coefficient $L_E$ and of the vector compensation coefficient $H_{PE}$ from the memory;

obtaining a measured magnetic field vector $H_{MEAS}$ representing magnetic field strength along three axes and a measured gravity vector $G_{MEAS}$ representing gravitational field strength along three axes;

using the matrix compensation coefficient $L_E$ and the vector compensation coefficient $H_{PE}$ to correct measured magnetic field data by applying a formula of the form $\hat{H}_{EARTH} = L_E \cdot H_{MEAS} - H_{PE}$, where $\hat{H}_{EARTH}$ is the compensated value for the Earth's true magnetic field; and calculating the azimuth data as a function of the corrected magnetic field data.

12. An electronic compass arrangement, comprising:

a three-axis magnetometer, configured to obtain a measured magnetic field vector $H_{MEAS}$ representing magnetic field strength along three axes;

a three-axis gravity sensor arrangement, configured to obtain a measured gravity vector $G_{MEAS}$ representing gravitational field strength along three axes;

a microprocessor arrangement, communicatively coupled to the three-axis magnetometer and to the three-axis gravity sensor arrangement and configured to use a matrix compensation coefficient $L_E$ and a vector compensation coefficient $H_{PE}$ to correct measured magnetic field data by applying a formula of the form $\hat{H}_{EARTH} = L_E \cdot H_{MEAS} - H_{PE}$, where $\hat{H}_{EARTH}$ is the compensated value for the Earth's true magnetic field, and calculate the azimuth data as a function of the corrected magnetic field data; and a memory, communicatively coupled to the microprocessor arrangement and configured to store the matrix compensation coefficient $L_E$ and the vector compensation coefficient $H_{PE}$.

13. The electronic compass arrangement of claim 12, wherein:

the three-axis magnetometer is further configured to obtain, for each of a plurality of combinations of orientations and azimuths, a measured magnetic field vector $H_{MEAS}$ representing magnetic field strength along three axes;

the three-axis gravity sensor arrangement is further configured to obtain, for each of the plurality of combinations of orientations and azimuths, a measured gravity vector $G_{MEAS}$ representing gravitational field strength along three axes; and the microprocessor arrangement is further configured to, before using the matrix compensation coefficient $L_E$ and the vector compensation coefficient $H_{PE}$ to correct measured magnetometer output data to obtain the accurate magnetic field data, calculate, as a function of the plurality of measured magnetic field vectors $H_{MEAS}$ and the plurality of measured gravity vectors $G_{MEAS}$, a matrix compensation coefficient $L_E$ and a vector compensation coefficient $H_{PE}$ by solving a system of equations.

14. The electronic compass arrangement of claim 13, wherein the plurality of measured magnetic field vectors $H_{MEAS}$ and the plurality of measured gravity vectors $G_{MEAS}$ are measured at four orientations for each of four azimuths, the orientations and azimuths being substantially evenly distributed in all angles.

15. The electronic compass arrangement of claim 13, wherein the system of equations comprises a plurality of equations of the form $$(L_E \cdot H_{MEAS} - H_{PE})' \cdot (L_E \cdot H_{MEAS} - H_{PE}) = H_0^2$$

wherein $H_0$ is the magnitude of $\hat{H}_{EARTH}$, and further comprises equations of the form $$G_{MEAS}' \cdot (L_E \cdot H_{MEAS} - H_{PE}) = H_{GRAV}$$

wherein $H_{GRAV}$ is a constant but unknown vertical component of $\hat{H}_{EARTH}$.

16. The electronic compass arrangement of claim 13, wherein the microprocessor arrangement is further configured to derive a full system of equations by rotating $\hat{H}_{EARTH}$ for each of the plurality of measured magnetic field vectors $H_{MEAS}$ into a north/east/down coordinate frame of reference.

17. The electronic compass arrangement of claim 13, wherein the system of equations comprises a first subset of linear equations.

18. The electronic compass arrangment of claim 17, wherein the microprocessor arrangment is further configured to:

solve the first subset of linear equations to calculate an estimate of the matrix compensation coefficient $L_E$ and an estimate of the vector compensation coefficient $H_{PE}$; and use the estimate of the matrix compensation coefficient $L_E$ and the estimate of the vector compensation coefficient $H_{PE}$ to solve the full system of equations to calculate the matrix compensation coefficient $L_E$ and the vector compensation coefficient $H_{PE}$.

19. The electronic compass arrangement of claim 18, wherein the microprocessor arrangement is further configured to iteratively solve the system of equations to refine the calculated matrix compensation coefficient $L_E$ and the calculated vector compensation coefficient $H_{PE}$.

20. A microprocessor-readable medium having microprocessor-executable instructions stored thereon, the microprocessor-executable instructions causing a microprocessor to, upon execution of the microprocessor-executable instructions:

obtain a measured magnetic field vector $H_{MEAS}$ representing magnetic field strength along three axes and a measured gravity vector $G_{MEAS}$ representing gravitational field strength along three axes;

use a matrix compensation coefficient $L_E$ and a vector compensation coefficient $H_{PE}$ to correct measured magnetic field data by applying a formula of the form $\hat{H}_{EARTH} = L_E \cdot H_{MEAS} - H_{PE}$, where $\hat{H}_{EARTH}$ is the compensated value for the Earth's true magnetic field; and calculate the azimuth data as a function of the corrected magnetic field data.

21. The microprocessor-readable medium of claim 20, wherein the microprocessor-executable instructions further cause the microprocessor to, upon execution of the microprocessor-executable instructions and before using the matrix compensation coefficient $L_E$ and the vector compensation coefficient $H_{PE}$ to correct measured magnetometer output data to obtain the accurate magnetic field data:

obtain, for each of a plurality of combinations of orientations and azimuths, a measured magnetic field vector $H_{MEAS}$ representing magnetic field strength along three axes and a measured gravity vector $G_{MEAS}$ representing gravitational field strength along three axes; and calculate, as a function of the plurality of measured magnetic field vectors $H_{MEAS}$ and the plurality of measured gravity vectors $G_{MEAS}$, a matrix compensation coefficient $L_E$ and a vector compensation coefficient $H_{PE}$ using a system of equations.

22. The microprocessor-readable medium of claim 21, wherein the plurality of measured magnetic field vectors $H_{MEAS}$ and the plurality of measured gravity vectors $G_{MEAS}$ are measured at four orientations for each of four azimuths, the orientations and azimuths being substantially evenly distributed in all angles.

23. The microprocessor-readable medium of claim 21, wherein the system of equations comprises a plurality of equations of the form $$(L_E \cdot H_{MEAS} - H_{PE})' \cdot (L_E \cdot H_{MEAS} - H_{PE}) = H_0^2$$

wherein $H_0$ is the magnitude of $\hat{H}_{EARTH}$, and further comprises equations of the form $$G_{MEAS}' \cdot (L_E \cdot H_{MEAS} - H_{PE}) = H_{GRAV}$$

wherein $H_{GRAV}$ is a constant but unknown vertical component of $\hat{H}_{EARTH}$.

24. The microprocessor-readable medium of claim 21, further comprising microprocessor-executable instructions causing a microprocessor to, upon execution, derive a full system of equations by rotating $\hat{H}_{EARTH}$ for each of the plurality of measured magnetic field vectors $H_{MEAS}$ into a north/east/down coordinate frame of reference.

25. The microprocessor-readable medium of claim 21, wherein the system of equations comprises a first subset of linear equations.

26. The microprocessor-readable medium of claim 25, further comprising microprocessor-executable instructions causing the microprocessor to, upon execution:

solve the first subset of linear equations to calculate an estimate of the matrix compensation coefficient $L_E$ and an estimate of the vector compensation coefficient $H_{PE}$; and use the estimate of the matrix compensation coefficient $L_E$ and the estimate of the vector compensation coefficient $H_{PE}$ to solve the full system of equations to calculate the matrix compensation coefficient $L_E$ and the vector compensation coefficient $H_{PE}$.

27. The microprocessor-readable medium of claim 26, further comprising microprocessor-executable instructions causing the microprocessor to, upon execution, iteratively solve the system of equations to refine the calculated matrix compensation coefficient $L_E$ and the calculated vector compensation coefficient $H_{PE}$.

* * * * *